United States Patent [19]

Staunton et al.

[11] Patent Number: 5,079,810
[45] Date of Patent: Jan. 14, 1992

[54] ULTRASONIC CUTTING OF FABRIC TUFTS TO PROVIDE IMPROVED RETENTION OF TUFT INDENTITY DURING USE

[75] Inventors: Harold F. Staunton, Avondale, Pa.; Yashavant V. Vinod, Hockessin, Del.

[73] Assignee: E. I. Du Pont de Nemours and Company, Wilmington, Del.

[21] Appl. No.: 635,014

[22] Filed: Dec. 28, 1990

[51] Int. Cl.⁵ .................... D06C 13/08; D05C 15/24
[52] U.S. Cl. ................................. 26/8 R; 112/80.55
[58] Field of Search ............... 112/80.55, 80.71; 26/8 R, 9

[56] References Cited

U.S. PATENT DOCUMENTS

| | | | |
|---|---|---|---|
| 3,765,193 | 10/1973 | Conroux et al. | 26/9 X |
| 3,879,835 | 4/1975 | Brumlik | 26/8 R X |
| 3,900,623 | 8/1975 | Hatt | 428/92 |
| 3,999,453 | 12/1976 | Damast et al. | 83/22 |
| 4,271,568 | 6/1981 | Durville et al. | 26/9 |
| 4,502,902 | 3/1985 | Zürcher et al. | 156/73.2 |
| 4,542,771 | 9/1985 | Payet et al. | 139/302 |
| 4,548,116 | 10/1985 | Yoshida et al. | 83/444 |
| 4,560,427 | 12/1985 | Flood | 156/733 |
| 4,582,740 | 4/1986 | Zürcher et al. | 428/88 |
| 4,610,750 | 9/1986 | Mango | 156/510 |
| 4,623,420 | 11/1986 | Hinkley | 156/515 |
| 4,629,858 | 12/1986 | Kyle | 26/9 X |
| 4,654,246 | 3/1987 | Provost et al. | 26/8 R X |
| 4,693,771 | 9/1987 | Payet et al. | 156/733 |
| 4,711,693 | 12/1987 | Holze, Jr. | 156/580.1 |

FOREIGN PATENT DOCUMENTS

| | | |
|---|---|---|
| 0097618 | 1/1984 | European Pat. Off. |
| WO88/03969 | 6/1988 | PCT Int'l Appl. |
| 1516110 | 6/1978 | United Kingdom |
| 2205116A | 11/1988 | United Kingdom |

Primary Examiner—Werner H. Schroeder
Assistant Examiner—Paul C. Lewis

[57] ABSTRACT

A process and apparatus for cutting tufted loops of yarn of a fabric, such as a carpet, by applying sufficient energy from an ultrasonically vibrating horn, operating with either a shearing or a pincer action in cooperation with a mechanical device, either or both having a cutting edge, to cause at least some of the filaments in said yarns to soften and fuse to adjacent filaments during cutting of said tufted loops.

21 Claims, 5 Drawing Sheets

FIG. 3E AFTER TIP SHEARING

INVENTION

FIG. 3C BEFORE TIP SHEARING

FIG. 3A CONVENTIONAL TUFTING

BEFORE

AFTER 8 HRS. V. DRUM 5,079,810

ULTRASONIC CUTTING OF FABRIC TUFTS TO PROVIDE IMPROVED RETENTION OF TUFT INDENTITY DURING USE

BACKGROUND OF THE INVENTION

1. Field of the Invention

The present invention relates to a method and apparatus for manufacturing cut-pile fabrics having improved wear properties. More specifically, the invention relates to a method and apparatus for ultrasonically cutting carpet pile loops in such a way that fusion of the filaments at the tips of the yarn tufts occurs, resulting in improved resistance to matting and tip-flaring.

2. Prior Art

Currently available cut-pile carpets have a relatively short lifetime in high-traffic areas where they quickly become matted and "ugly-out", losing their appearance of newness. Several methods of improving texture retention and wear properties are known in the art. Increasing carpet density improves durability somewhat but is costly. Hatt, U.S. Pat. No. 3,900,623, discloses a carpet in which a large portion of the filaments in and near the tops of the pile tufts are highly interlaced which gives improved retention of tuft identity and substantially prevents tip-flaring after prolonged use in traffic. The use of heat-activated binder fibers in carpet yarns to improve retention of tuft identity is disclosed in the published patent applications Hackler PCT-WO 88/03969 and Watt & Fowler GB 2205116-A. The binder fibers melt during twist-setting and bond the filaments of the yarn together resulting in improved twist retention and enhanced wear properties.

Cut-pile carpets are currently manufactured by tufting loops of carpet yarn into a primary backing on a tufting machine. A knife cuts the loops as they are formed to give a cut-pile carpet. The carpet is dyed, and latex and a secondary backing are then applied. The carpet is then trimmed to the correct width and sheared using revolving shearing blades to remove fuzz and to cut any fibers which are longer than the desired pile height to yield a smooth and even surface.

The present invention relates to the use of ultrasonic vibrational energy to simultaneously cut and fuse yarn loops of a pile fabric. The use of a focussed laser beam to cut thread loops of a pile fabric by combustion is disclosed in Durville et al., U.S. Pat. No. 4,271,568. Seiler & Zurcher, published application EP 0097618, discloses methods for cutting filaments or fibers by heating with a laser beam while subjecting the fibers to a tensile stress such that fibers are drawn before rupturing, resulting in a pointed end at the tips of the filaments. Neither of these references discloses the fusion of a number of filament bundles, such as in a carpet tuft, during the cutting process.

SUMMARY OF THE INVENTION

The present invention relates to a process for cutting the tufted yarn loops of a pile fabric comprising engaging a yarn loop with a cutting means, urging said cutting means through the filaments of said yarn loop while ultrasonically vibrating the filaments of said yarn loop whereby at least some of the filaments constituting said yarn loop are fused to adjacent filaments, and withdrawing said cutting means from engagement with the resulting cut and fused yarn. Preferably, the urging step is performed by bringing said yarn loop between an ultrasonically vibrating member and another member adapted to cooperate with the ultrasonically vibrating member to cut the filaments in said loop, and urging such members together to cut the filaments constituting said yarn loop while fusing at least some of the filaments of said loop to adjacent filaments.

As will be explained in further detail hereinafter, an ultrasonic horn is preferably used as the ultrasonically vibrating member, while either a pincer or a shearing action may be used to achieve the cutting and fusing of the filaments.

A further embodiment of the invention relates to an apparatus for cutting and fusing the filaments of tufted yarn loops of a pile fabric comprising means for engaging a yarn loop with a cutting means; means for urging said cutting means through the filaments of said yarn loop while ultrasonically vibrating the filaments of said yarn loop whereby at least some of the filaments constituting said yarn loop are fused to adjacent filaments; and means for withdrawing said cutting means from engagement with the resulting cut and fused yarn. In one form the urging means comprises means for bringing the yarn loop between an ultrasonically vibrating member and another member adapted to cooperate with the ultrasonically vibrating member to cut the filaments in the loop, and means for urging such members together—either in a pincer or shearing action—to cut the filaments constituting the yarn loop while fusing at least some of the filaments of the loop to adjacent filaments.

In accordance with the present invention, the tufted yarn loops of the carpet or other fabric are cut using ultrasonic energy rather than traditional mechanical cutting means currently used in the manufacture of cut-pile fabrics. The tufts maintain their coherence through fusion of the filaments at the tuft tips. The yarn loops may be comprised of any of or a blend of a number of synthetic polymers, including polyamides, acrylics, polyesters, or polyolefins. The synthetic polymer filaments may also be blended with natural fibers. It is also possible to incorporate low-melting binder filaments in the yarns. The cut-pile fabrics prepared in accordance with the method of the present invention exhibit excellent resistance to untwisting, matting, and tip-flaring since the filaments are fused at the tips of the individual tufts.

BRIEF DESCRIPTION OF THE FIGURES

FIGS. 3A-F are photographic top views of conventional cut-pile carpets and cut-pile carpets prepared according to the current invention, before and after wear testing.

DETAILED DESCRIPTION OF THE INVENTION

In one form, the process of the present invention involves fusing the tips of individual pile tufts while cutting the tops of the loops of a loop-pile fabric by placing each loop between an ultrasonic horn and a cutting anvil, then applying sufficient vibrational energy to sever the yarn with a pincer action while fusing the filaments in each of the two resultant tuft tips. The success of this procedure depends on the proper choice of tooling (horn and anvil) design, ultrasonic frequency, horn vibration amplitude, contact pressure and cutting-/fusing time. Ultrasonic frequencies can be in the 16–100 kHz range, with the preferred frequency range being from 20–60 kHz. The best cutting/fusing performance has been obtained at about 40 kHz. The horn vibrational amplitude, contact pressure and cutting/fusing time may be varied, and acceptable values may be readily determined empirically by one skilled in the art.

Figure 1:
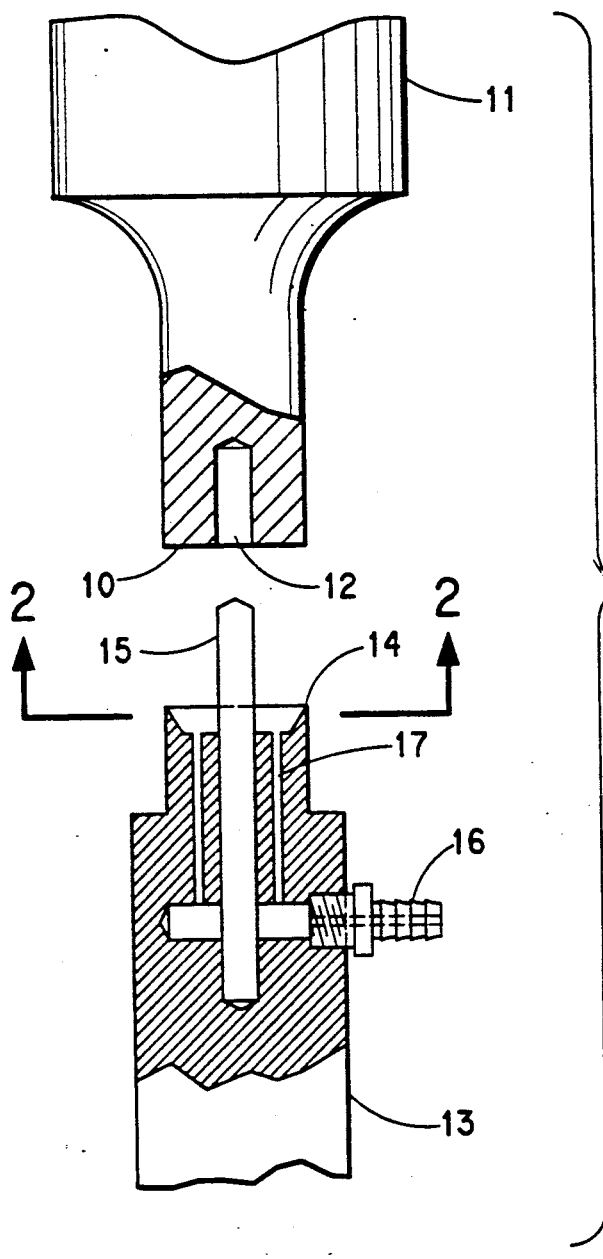
FIG. 1 is a schematic view of a horn and anvil assembly suitable for cutting loop-pile tufts in accordance with the present invention.
Figure 2:
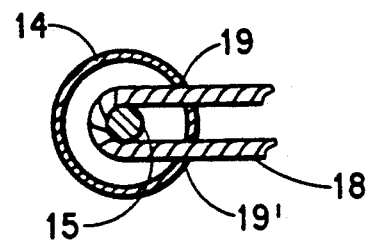
FIG. 2 is a top elevation view of the anvil of FIG. 1 taken on line 2—2 of FIG. 1, showing the positioning of the yarn loop prior to cutting/fusing.
Figure 3F:
Figure 3F:
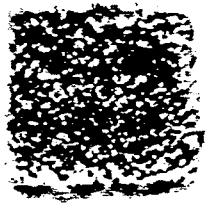
Figure 3D:
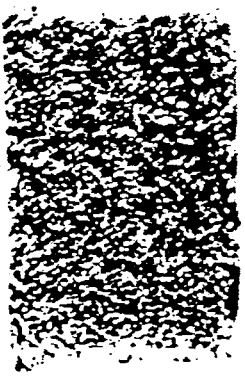
Figure 3D:
Figure 3B:
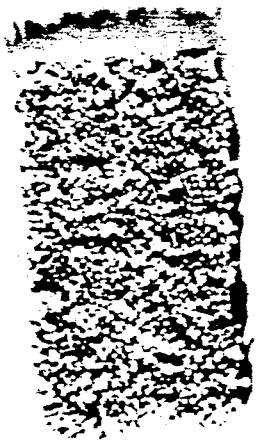
Figure 3B:

FIGS. 1 and 2 depict a horn and anvil combination suitable for performing the method of the current invention. An ultrasonic horn 11 has a hole 12 machined into its bottom surface to clear pin 15 of the anvil 13. A pile loop 18 (FIG. 2) is threaded onto the pin 15 and contacts the anvil cutting edge 14 at points 19 and 19'. The ultrasonic horn 11 is lowered so as to apply pressure on the yarn with the generally flat surface of rim 10 serving to press the two contact points 19 and 19' against cutting edge 14 while applying vibrational energy to simultaneously cut and fuse the yarn loop at the two contact points thus generating two pile tufts. Alternatively, rim 10 of the ultrasonically vibrating horn could be sharpened to serve as a cutting edge with edge 14 of the anvil serving as the generally flat surface. The resulting cut and fused tufts are then withdrawn. The cut end of the loop which corresponds to the portion of the yarn between points 19 and 19' is removed by introducing an air blast through air passages 17 using an air source (not shown) attached to the air hose connector 16.

Figure 6:
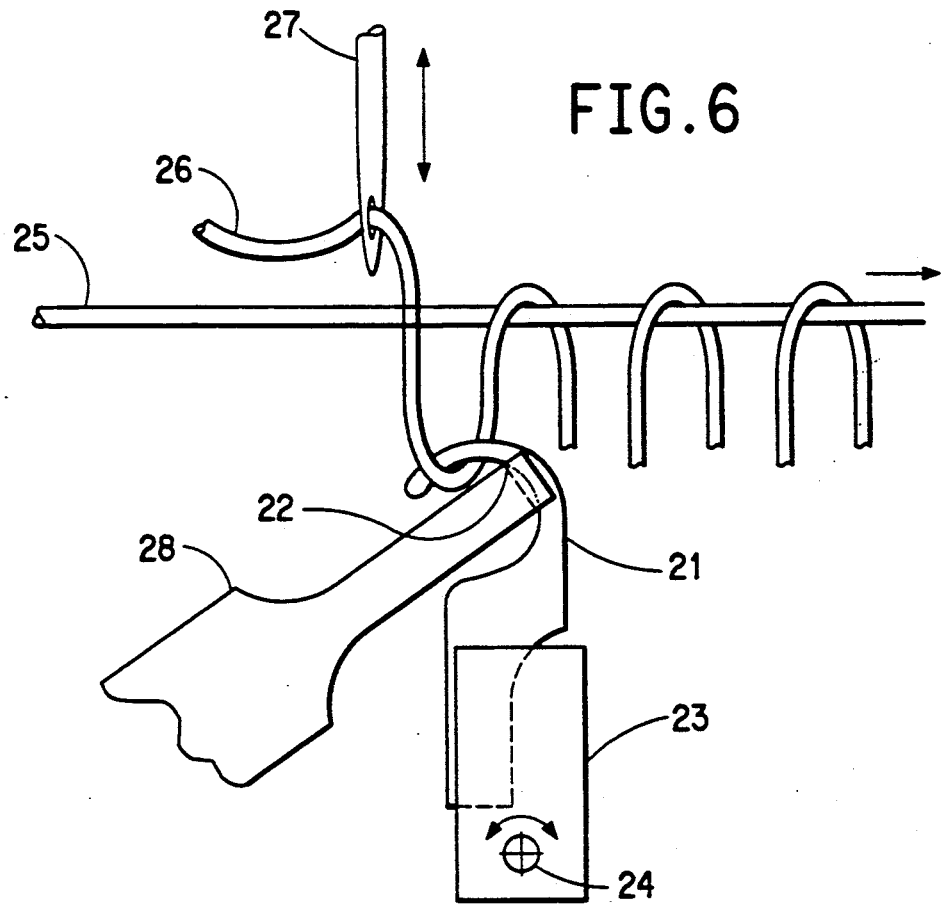
FIG. 6 is a schematic side view of an alternate apparatus for performing the present invention in conjunction with a tufting machine.
Figure 7:
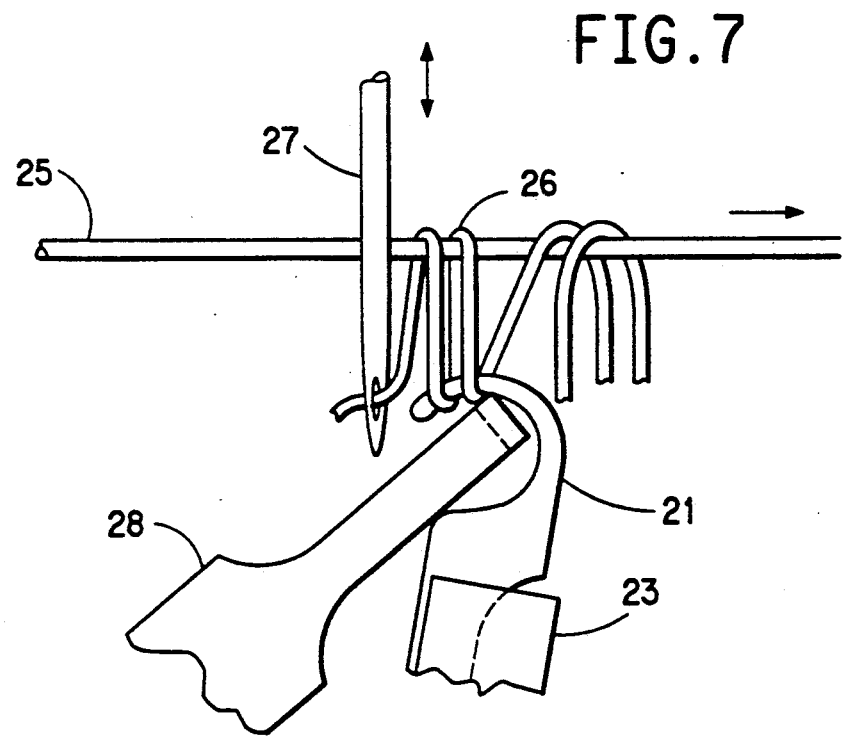
FIG. 7 is a schematic side view of the apparatus depicted in FIG. 6 in another position encountered during use.
Figure 8:
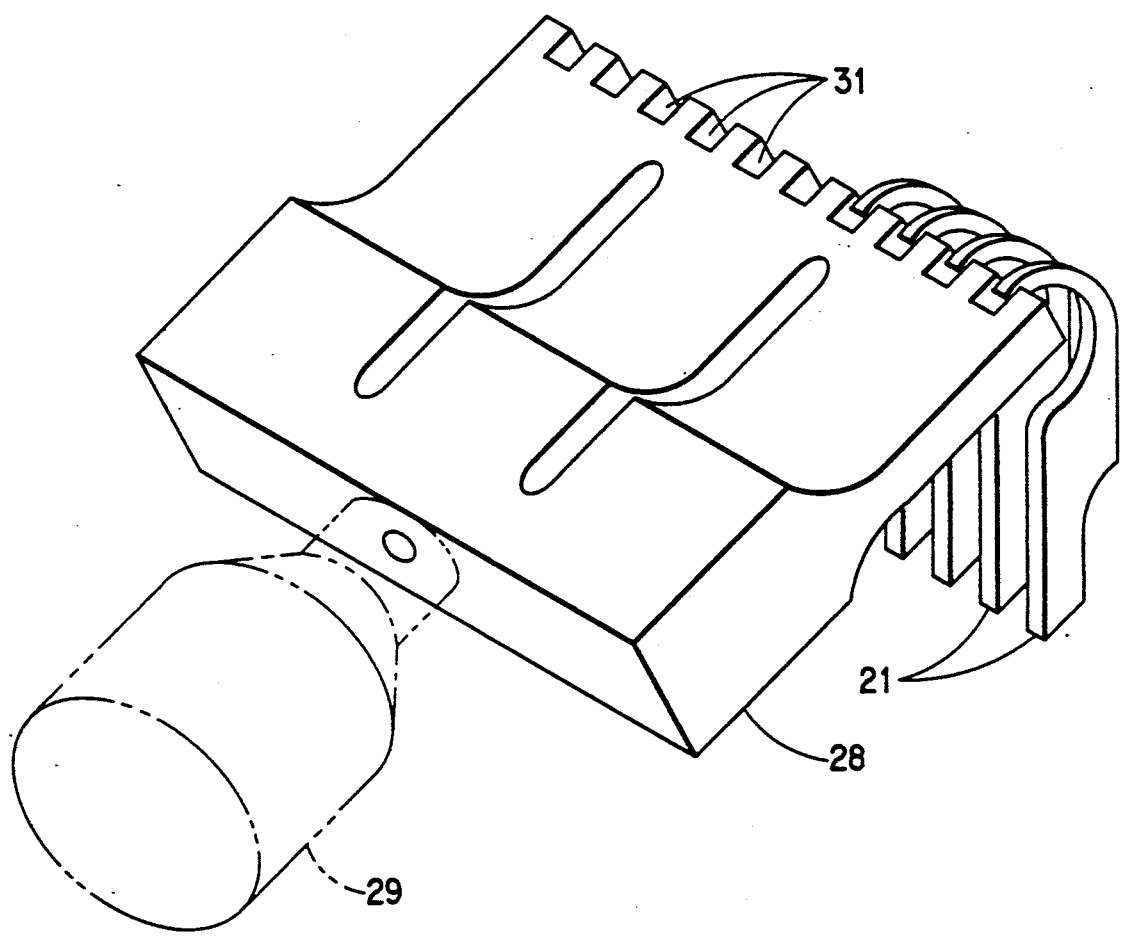
FIG. 8 is a schematic perspective view of the apparatus depicted in FIGS. 6 and 7.

An alternative process of the present invention involves fusing the tips of the individual tufts while ultrasonically cutting the yarn loops with a shearing action as they are produced on a carpet tufting machine, as depicted in FIGS. 6–8. In this embodiment, the ultrasonic horn may replace the knife blades conventionally employed on the tufting machine to cut the yarn loops. Similar ultrasonic hardware considerations and conditions that are described above also apply to this method, and 40 kHz is again the optimal choice of frequency.

Referring now to FIG. 8, ultrasonic horn 28 is provided with a plurality of slots 31 adapted to engage a plurality of tufting machine hooks 21 in such a way that interference between one of the front edges of each slot 31 and the sharpened edge 22 (FIG. 6) of each corresponding hook 21 produces a vibratory shearing action to simultaneously cut and fuse the filaments in the yarn tufts looped around hook 21. Horn 28 is ultrasonically vibrated by a piezoelectric or magnetostrictive transducer 29 in a conventional manner. Referring to FIGS. 6–7, tufting machine hook 21 is mounted in oscillating mount 23 rotatable about axis 24. A carpet backing material 25 is fed from left to right and tufted with yarn 26 by tufting needle 27 to loop tufts around hook 21 as needle 27 is moved in an up and down motion. Hooks 21 are oscillated between the position depicted by FIG. 7 and the position depicted by FIG. 6 to engage yarn 26 to constrain the yarn loops as yarn 26 is withdrawn from needle 27. As tufting proceeds, hook 21 retains one or more yarn loops, and each loop is finally shear cut by horn 28 at the location crossing sharpened edge 22 as hook 21 pivots to the position depicted by FIG. 6, engaging slot 31 of horn 28. The vibratory shear cutting of the yarn loop provides the ultrasonic energy required to fuse some of the filaments in yarn 26 to adjacent filaments.

Just as with the horn and anvil process and apparatus described above, the vibrating horn itself may also be sharpened to serve as the cutting edge. For example, the edge of slot 31 could be sharpened in addition to or as an alternative to the sharpened edge 22 of cutting hook 21.

The carpets of the current invention typically have a harsher hand than conventional cut-pile carpets. The degree of harshness may be reduced by limiting the degree of fusion of the filaments at the tuft tip. This can be accomplished by adjusting the ultrasonic energy level or by controlling the cutting/fusing time. It is not necessary that all the filaments within the tuft are fused at the tips in order to achieve the benefit of improved wear resistance. If too many of the filaments are fused, an unacceptably harsh hand can result.

Test Methods

Wear tests were conducted in a Vetterman drum test apparatus, Type KSG manufactured by Schoenberg & Co. (Baumberg, Germany). The drum is lined with carpet samples with the pile facing inwards and contains a steel ball having 14 rubber buffers which rolls randomly inside the rotating drum. The drum is rotated in alternating directions for a total of 8 hours and 8800 revolutions. A circular brush within the drum is in light contact with the carpet surface and removes loose pile fibers which are continuously removed by suction. After 8800 cycles, the samples are removed and inspected to evaluate texture retention.

Texture retention is determined using a scale of 1–5 with a rating of 5 corresponding to an untested control sample and 1 corresponding to an extremely matted control sample. Each carpet being evaluated is rated by six different people, and the average of those ratings is reported in Table I.

EXAMPLES

Example 1

A bulked continuous filament nylon 6,6 yarn of 1950 total denier was produced by a conventional process. Two of these yarns were plied and twisted to provide a yarn having a twist of 3.75 turns per inch. The resulting yarn was then heat-set in a conventional manner using a Superba heat-setting apparatus at 130° C. A loop-pile tufted carpet was constructed from the heatset yarn to the following specifications: 40 oz/yd$^2$ (1.36 kg/m$^2$), 36/64 inch (1.42×10$^{-2}$ m) pile height, 5/32 gauge, and 6.5 stitches per inch (256 stitches per meter). The carpet was dyed to a blue-grey color using a conventional beck dyeing process and was hand latexed. The loop-pile sample was sheared using a conventional carpet shearing machine made by the Sellers Company to give a cut-pile carpet having a pile height of 20/64 in.

($8 \times 10^{-3}$ m). The cut-pile carpet was prepared by shearing versus the commercial method of cutting on the tufting machine and then shearing in order to obtain a carpet of identical construction to the cut-pile samples prepared below using the process of the present invention.

Example 2

A loop-pile sample identical to that prepared in Example 1 was converted to a cut-pile carpet with fused tuft tips by utilizing an ultrasonic pneumatic press manufactured by Dukane Corporation (Model 48B350, 40 kHz 350 watt press system), fitted with the custom horn and hardened steel cutting anvil depicted schematically in FIG. 1 which was designed to readily sever the loop tops and fuse the resultant two tuft tips. To expedite this operation, the carpet was folded back on itself sharply to separate a single row of loops from the adjacent rows of tufted loops so as to enable the operator to process individual carpet loops. Each loop was ultrasonically cut in two locations as described above to generate two individual tufts, yielding a cut-pile carpet having a final pile height of 22/64 in. ($8.7 \times 10^{-3}$ m). The loops were cut and tuft tips fused by placing the loop on the cutting anvil in the desired manner, then initiating an automatic sequence that brought the vibrating horn in contact with the loop for a period of approximately 300 msec, at a contact pressure of 18 psi (124 kPa). The vibration amplitude at the end of the horn contacting the yarn loops and anvil was approximately 0.002 in. ($5.1 \times 10^{-5}$ m) peak-to-peak.

Example 3

A portion of the ultrasonically-cut carpet of Example 2 was sheared using a conventional carpet shearing machine manufactured by the Sellers Company to give a cut-pile carpet having a pile height of 20/64 in ($7.94 \times 10^{-3}$ m). This sample is expected to simulate a carpet that is ultrasonically cut on a tufting machine, followed by a conventional shearing process.

The carpet samples from Examples 1-3 were subjected to 8 hours in the Vetterman drum test described above and evaluated for texture retention.

The results are reported in TABLE I.

TABLE I

| SAMPLE | TEXTURE RETENTION RATING | APPEARANCE |
|---|---|---|
| EXAMPLE 1 | 1.6 | Open and fuzzed tuft tips; pile matted & crushed |
| EXAMPLE 2 | 3.3 | Intact tip definition; harsh hand |
| EXAMPLE 3 | 3.8 | Same as EXAMPLE 2 above |

FIG. 3 is a photograph showing samples of the carpets of the above examples before and after wear testing. The conventional carpet sample of Example 1 (FIG. 3B) appears extremely matted following the Vetterman drum testing, whereas the carpets of Examples 2 and 3 (FIGS. 3D and 3F), which were ultrasonically cut, significantly retain their original tuft definition. This is also reflected in the texture retention ratings reported in TABLE I. The shearing step used in Example 3 did not affect the final texture retention rating versus the unsheared ultrasonically-cut carpet sample of Example 2. It is important that the fused portions of the tuft tips are not completely removed in the shearing process, since the benefit of the current invention will be lost if the tufts are not partially fused at the tips.

Figures 4A, 4B, 4C:
FIGS. 4A-C are photomicrographs taken at 4x magnification, showing side views of tufts removed from the as-prepared carpet samples of FIGS. 3A, 3C and 3E.
Figures 5A, 5B, 5C:
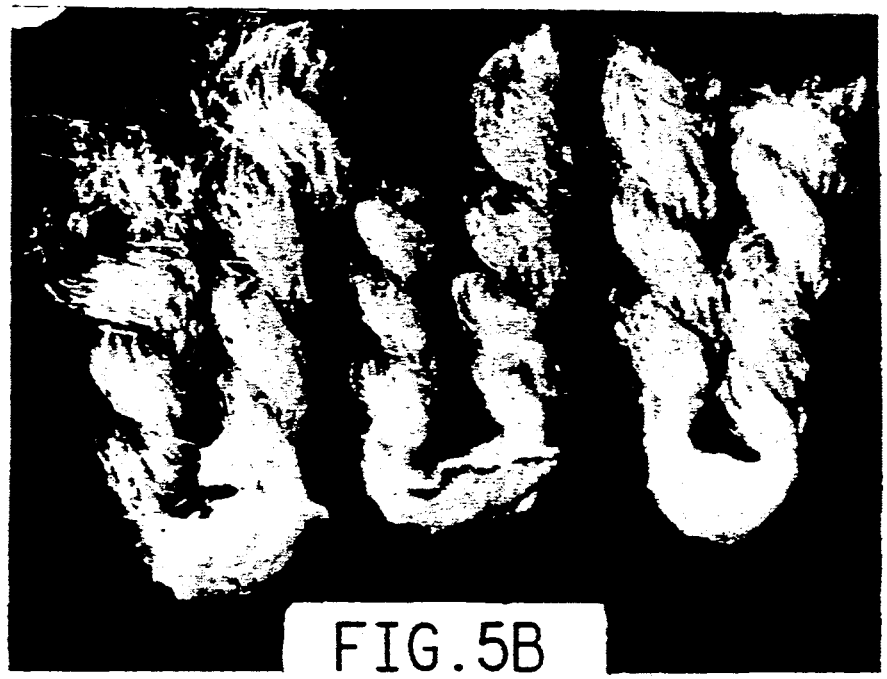
FIGS. 5A-C are photomicrographs taken at 5x magnification, showing side views of tufts removed from the wear-tested samples of FIGS. 3B, 3D and 3F.

FIG. 4 is a photomicrograph taken at 4x magnification which shows side views of carpet tufts removed from the as-prepared carpet samples of Examples 1-3 and labelled as FIGS. 4A-4C, respectively. It is apparent from this figure that a cleaner cut is achieved via ultrasonic versus mechanical cutting. FIG. 5 is a photomicrograph taken at 5x magnification which shows side views of the above carpet tufts of Examples 1-3 after Vetterman drum testing and labelled as FIGS. 5A-5C, respectively. The mechanically-cut tuft shown in FIG. 5A exhibits significant tip flaring versus the ultrasonically-cut tufts shown in FIG. 5B and FIG. 5C which exhibit negligible tip flaring.

We claim:

1. A process for cutting the tufted yarn loops of a pile fabric comprising:
   (a) engaging a yarn loop with a cutting means;
   (b) urging said cutting means through the filaments of said yarn loop while ultrasonically vibrating the filaments of said yarn loop whereby at least some of the filaments constituting said yarn loop are fused to adjacent filaments; and
   (c) withdrawing said cutting means from engagement with the resulting cut and fused yarn.

2. The process of claim 1 wherein the urging step is performed by bringing said yarn loop between an ultrasonically vibrating member having a generally flat surface and another member having a cutting edge, said other member being adapted to cooperate with the ultrasonically vibrating member to cut the filaments in said loop, and urging such members together to cut the filaments constituting said yarn loop while fusing at least some of the filaments of said loop to adjacent filaments.

3. The process of claim 2 wherein the pile fabric is in the form of a carpet.

4. The process of claim 2 wherein the cutting action is achieved by urging the cutting edge of the adapted member against the generally flat surface of the ultrasonically vibrating member in a pincer action.

5. The process of claim 4 wherein the ultrasonic vibrations are in the frequency range of 16 to 100 kHz.

6. The process of claim 5 wherein the ultrasonic vibrations are in the frequency range of 20 to 60 kHz.

7. The process of claim 2 wherein the cutting action is achieved by urging the cutting edge of the adapted member into close sliding contact with an edge of the ultrasonically vibrating member in a shearing action.

8. The process of claim 7 wherein the ultrasonic vibrations are in the frequency range of 16 to 100 kHz.

9. The process of claim 8 wherein the ultrasonic vibrations are in the frequency range of 20 to 60 kHz.

10. The process of claim 1 wherein the urging step is performed by bringing said yarn loop between an ultrasonically vibrating member having a cutting edge and another member having a generally flat surface, said other member being adapted to cooperate with the ultrasonically vibrating member to cut the filaments in said loop, and urging such members together to cut the filaments constituting said yarn loop while fusing at least some of the filaments of said loop to adjacent filaments.

11. The process of claim 10 wherein the pile fabric is in the form of a carpet.

12. The process of claim 10 wherein the cutting action is achieved by urging the cutting edge of the ultrasonically vibrating member against the generally flat surface of the adapted member in a pincer action.

13. The process of claim 12 wherein the ultrasonic vibrations are in the frequency range of 16 to 100 kHz.

14. The process of claim 13 wherein the ultrasonic vibrations are in the frequency range of 20 to 60 kHz.

15. The process of claim 10 wherein the cutting action is achieved by urging the cutting edge of the ultrasonically vibrating member into close sliding contact with an edge of the ultrasonically vibrating member in a shearing action.

16. The process of claim 15 wherein the ultrasonic vibrations are in the frequency range of 16 to 100 kHz.

17. The process of claim 16 wherein the ultrasonic vibrations are in the frequency range of 20 to 60 kHz.

18. An apparatus for cutting the tufted yarn loops of a pile fabric comprising:
    (a) means for engaging a yarn loop with a cutting means;
    (b) means for urging said cutting means through the filaments of said yarn loop while ultrasonically vibrating the filaments of said yarn loop whereby at least some of the filaments constituting said yarn loop are fused to adjacent filaments; and
    (c) means for withdrawing said cutting means from engagement with the resulting cut and fused yarn.

19. The apparatus of claim 18 wherein the urging means comprises means for bringing said yarn loop between an ultrasonically vibrating member and another member adapted to cooperate with the ultrasonically vibrating member to cut the filaments in said loop, and means for urging such members together to cut the filaments constituting said yarn loop while fusing at least some of the filaments of said loop to adjacent filaments.

20. The apparatus of claim 18 wherein the cutting means is urged through the filaments of the yarn loop in a pincer action.

21. The apparatus of claim 18 wherein the cutting means is urged through the filaments of the yarn loop in a shearing action.

* * * * *